(12) United States Patent
Tang

(10) Patent No.: US 12,704,643 B1
(45) Date of Patent: Aug. 11, 2026

(54) PROTECTION APPARATUS FOR WIRELESS POSITIONING DEVICE

(71) Applicant: HANGZHOU YIMAO E-COMMERCE CO., LTD, Zhejiang (CN)

(72) Inventor: Peipeng Tang, Zhejiang (CN)

(73) Assignee: HANGZHOU YIMAO E-COMMERCE CO., LTD, Hangzhou (CN)

( * ) Notice: Subject to any disclaimer, the term of this patent is extended or adjusted under 35 U.S.C. 154(b) by 0 days.

(21) Appl. No.: 19/357,123

(22) Filed: Oct. 14, 2025

(30) Foreign Application Priority Data

Sep. 19, 2025 (CN) ........................ 202522026790.7

(51) Int. Cl.
*G01S 19/35* (2010.01)
*G01S 19/14* (2010.01)
*G01S 19/31* (2010.01)

(52) U.S. Cl.
CPC .............. *G01S 19/35* (2013.01); *G01S 19/14* (2013.01); *G01S 19/31* (2013.01); *G01S 2201/01* (2019.08)

(58) Field of Classification Search
CPC .......... G01S 19/35; G01S 19/14; G01S 19/31; G01S 2201/01
See application file for complete search history.

(56) References Cited

U.S. PATENT DOCUMENTS 1,785,186 A * 12/1930 Day ....................... A44C 3/001 40/765
3,136,014 A * 6/1964 Nickerson ................ A44B 9/14 24/710
D407,985 S * 4/1999 Pimentel .................. D10/104.2
11,910,888 B1 * 2/2024 Hopkins .................. A44B 9/16
D1,043,102 S * 9/2024 Lu ............................ D10/104.1
12,393,817 B1 * 8/2025 Hopkins .......... G06K 19/07758
2016/0177597 A1 * 6/2016 Mainetti ................ A44B 99/00 24/453

* cited by examiner

*Primary Examiner* — David M Upchurch

(57) ABSTRACT

The present application discloses a protection apparatus for wireless positioning device including a housing and a pin assembly. The housing is provided with a mounting groove and a fixing groove. The mounting groove is used for accommodating the wireless positioning device, and the fixing groove is formed by inwardly recessing one side surface of the housing. The pin assembly is installed in the fixing groove and is used for connecting the housing and other objects. In the present application, the pin assembly is completely housed within the fixing groove, preventing the pin assembly from being exposed outside the housing, reducing the thickness of the wireless positioning device protection apparatus and improving its safety.

16 Claims, 11 Drawing Sheets

PROTECTION APPARATUS FOR WIRELESS POSITIONING DEVICE

CROSS REFERENCE TO RELATED APPLICATION

The present application claims priority of Chinese Patent Application No. 2025220267907 filed on Sep. 19, 2025, the entire contents of which are hereby incorporated by reference.

TECHNICAL FIELD

The present application relates to the technical field of tracking and positioning devices, and particularly relates to a protection apparatus for wireless positioning device.

BACKGROUND ART

With an increasing demand for tracking personal items, pets, and children, wireless positioning devices such as Air Tag have achieved widespread application due to their compact size and high portability. Such devices are typically attached to backpacks, pet collars, or children's clothing via accessories such as keychains, cords, or pin structures, and utilize wireless signal transmission to achieve real-time positioning and tracking, providing users with solutions for item loss prevention and personal safety monitoring.

To avoid the impact of collisions and wear on the positioning device during use, various protective devices have been developed in the market. However, the existing protective device has obvious defects in structural design: the pin structure used for fixation is directly exposed outside the housing of the device. This design on one hand causes the overall thickness of the protective device to increase, undermining the original compact and portable characteristics of the positioning equipment and making it prone to snagging with other items during carrying; on the other hand, the exposed pin structure has sharp ends protruding, which may cause safety hazards such as scratches or puncture wounds when in contact with humans (especially children) or pets, significantly reducing the usage safety of the protective device.

SUMMARY OF THE INVENTION

An embodiment of the present application provides a protection apparatus for wireless positioning device, configured to solve the problem that the existing protection apparatus for wireless positioning devices has a relatively large overall thickness and low security.

In a first aspect, the present application provides a protection apparatus for wireless positioning device including:

- a housing provided with a mounting groove and a fixing groove, the mounting groove being configured to accommodate the wireless positioning device, and the fixing groove being formed by an inward recess from one side surface of the housing; and
- a pin assembly installed in the fixing groove, the pin assembly being used to connect the housing and other objects.

Further, the housing is further provided with a clamping groove communicating with the fixing groove, the clamping groove being formed by a recess extending inwardly from a wall of the fixing groove in a direction away from the fixing groove, and the clamping groove being engaged with the pin assembly.

Further, the housing is provided with two clamping grooves oppositely provided on both sides of the fixing groove respectively, and the two clamping grooves are respectively engaged with edge portions on both sides of the pin assembly.

Further, the clamping groove is circumferentially provided around a periphery of the fixing groove in the circumferential direction of the fixing groove, and the clamping groove is engaged with an edge of the pin assembly.

Further, the fixing groove has a groove width of L1, and a distance from a top end of the clamping groove above the fixing groove to a bottom end of the clamping groove below the fixing groove is L2, where L1 and L2 satisfy: $10\% < L1/L2 < 88\%$.

Further, the mounting groove includes a mounting cavity and an opening, the mounting cavity is located inside the housing, and the opening communicates the mounting cavity with an exterior of the housing.

Further, an opening area S1 and a mounting cavity area S2 satisfy: $10\% < S1/S2 < 93\%$.

Further, an opening of the mounting groove and an opening of the fixing groove are respectively located on opposite sides of the housing.

Further, the fixing groove is provided on the top of the housing, and the mounting groove is provided below the fixing groove.

Further, an avoidance opening is provided at a top of the fixing groove, the avoidance opening communicating an interior of the fixing groove with outside.

Further, the pin assembly and the housing are of a split structure.

Further, the housing at a position where the fixing groove is provided is made of a soft material.

Further, the pin assembly and the housing are of an integral structure.

Further, the pin assembly includes a mounting base and a pin, the mounting base being fixedly connected to the housing, the pin has one end fixedly connected to the mounting base and the other end detachably connected to the mounting base.

Further, the mounting base includes a fixing plate and a mounting seat, the fixing plate being fixedly connected to the housing, the mounting seat being fixedly provided on the fixing plate, the mounting seat has one end fixedly connected to one end of the pin and the other end detachably connected to the other end of the pin.

Further, the fixing plate is provided with a fixing buckle, the mounting seat is provided with a through hole, and the through hole and the fixing buckle are engaged and fixed.

Further, the fixing plate is provided with two spaced fixing buckles, and ends of the two fixing buckles extend toward each other, the mounting seat is provided with two spaced through holes, and the two through holes are respectively engaged with the two fixing buckles.

Further, the pin has one end provided with a spring coil and the other end taken as a needle end, the spring coil is fixedly connected to one end of the mounting seat, and the needle end is detachably connected to the other end of the mounting seat.

Further, the mounting seat has one end provided with a connection slot and the other end provided with a pin buckle, the connection slot being fixedly connected to the spring coil, and the pin buckle being engaged with the needle end.

Further, the other end of the mounting seat is further provided with a blocking part, the blocking part being provided to cover a side of the pin buckle away from the connection slot, the blocking part being configured to limit position of the needle end.

The present application provides a protection apparatus for wireless positioning device, by providing the mounting groove and the fixing groove on the housing of the protection apparatus for wireless positioning device, the wireless positioning device is installed in the mounting groove, and the pin assembly is installed in the fixing groove. The housing is connected to other objects via the pin assembly, thereby achieving convenient wearing of the wireless positioning device. The pin assembly is completely housed within the fixing groove, preventing the pin assembly from being exposed outside the housing, reducing the thickness of the protection apparatus for wireless positioning device and improving its safety.

BRIEF DESCRIPTION OF THE DRAWINGS

In order to clearly explain the technical solutions of the embodiments of the present application, below is a brief introduction of the drawings that will be used in the description of the embodiments. Obviously, the drawings described below are some embodiments of the present application, and for a person skilled in the art, other drawings can also be obtained from these drawings without creative effort.

REFERENCE NUMERALS

Figure 1A:
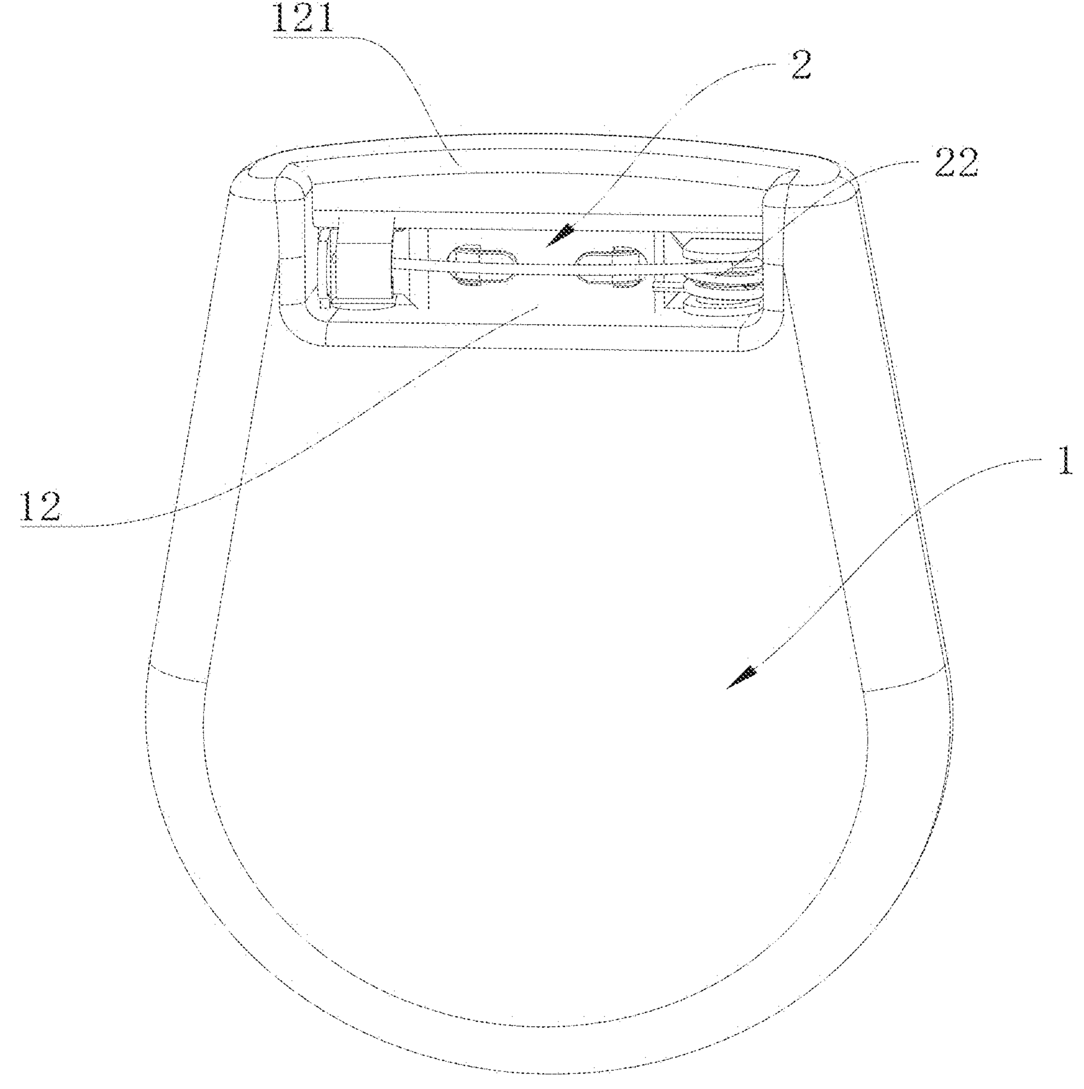
FIG. 1A to FIG. 1D are schematic structural diagrams of different views of a protection apparatus for wireless positioning device according to an embodiment of the present application.
Figure 1B:
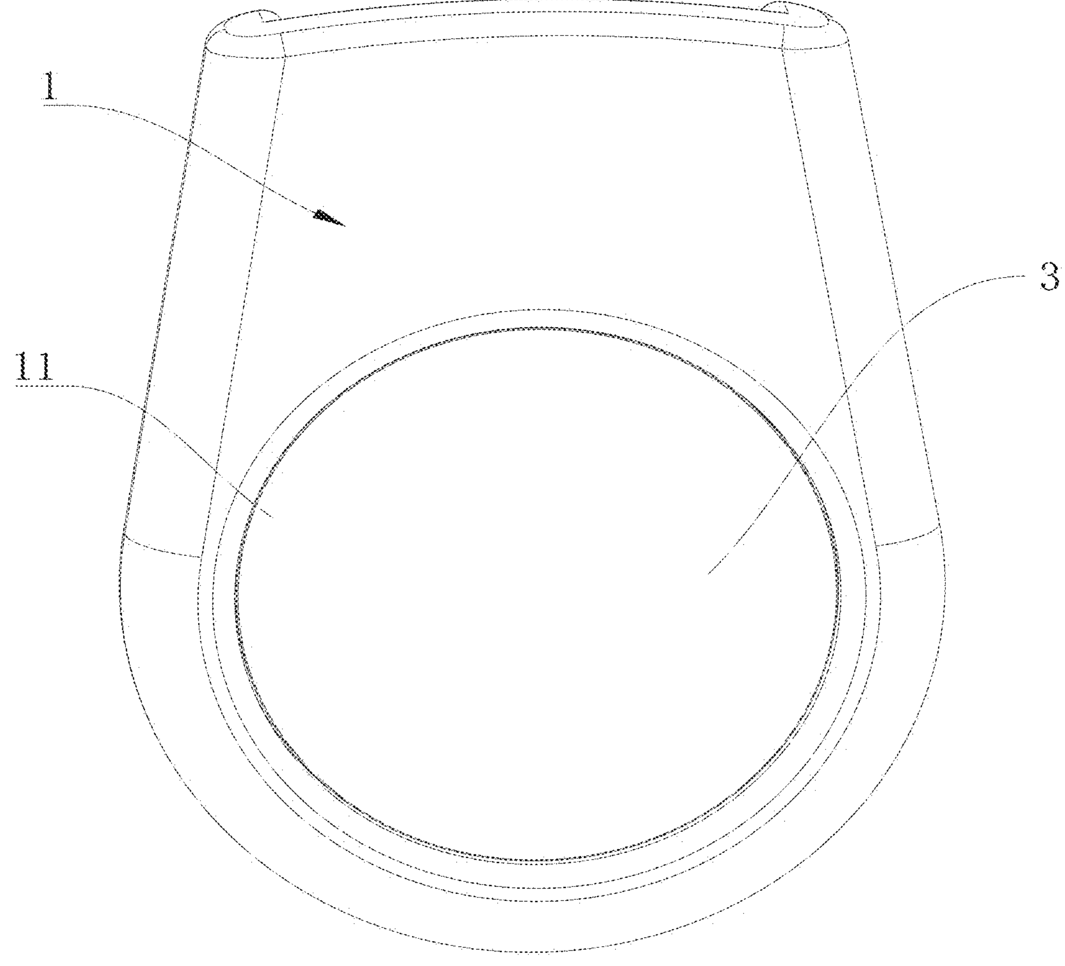
Figure 1C:
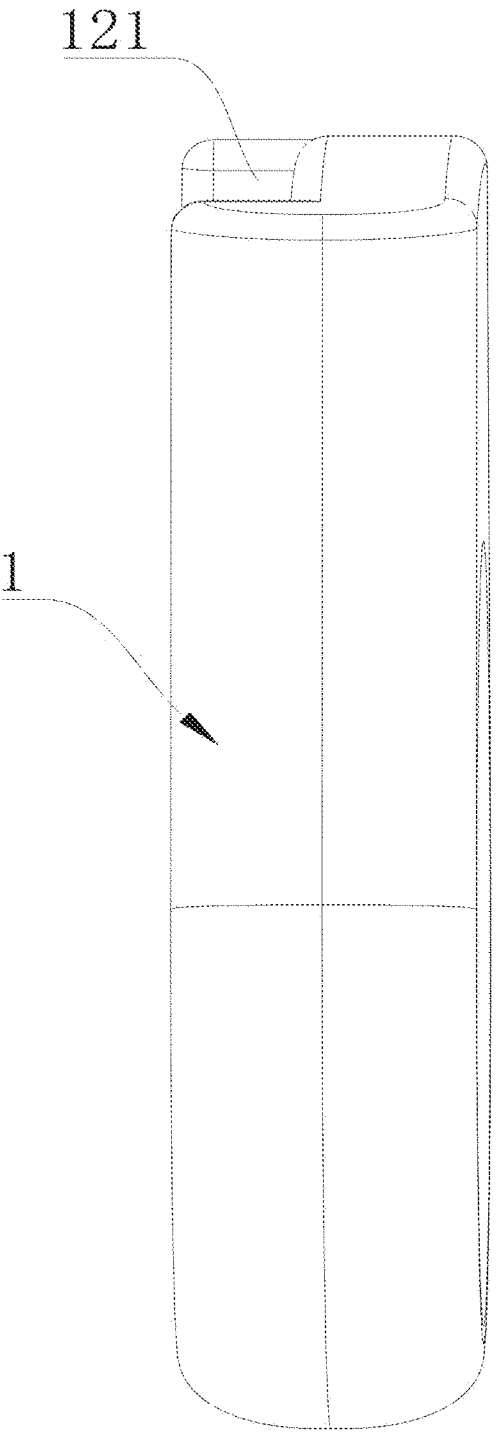
Figure 1D:
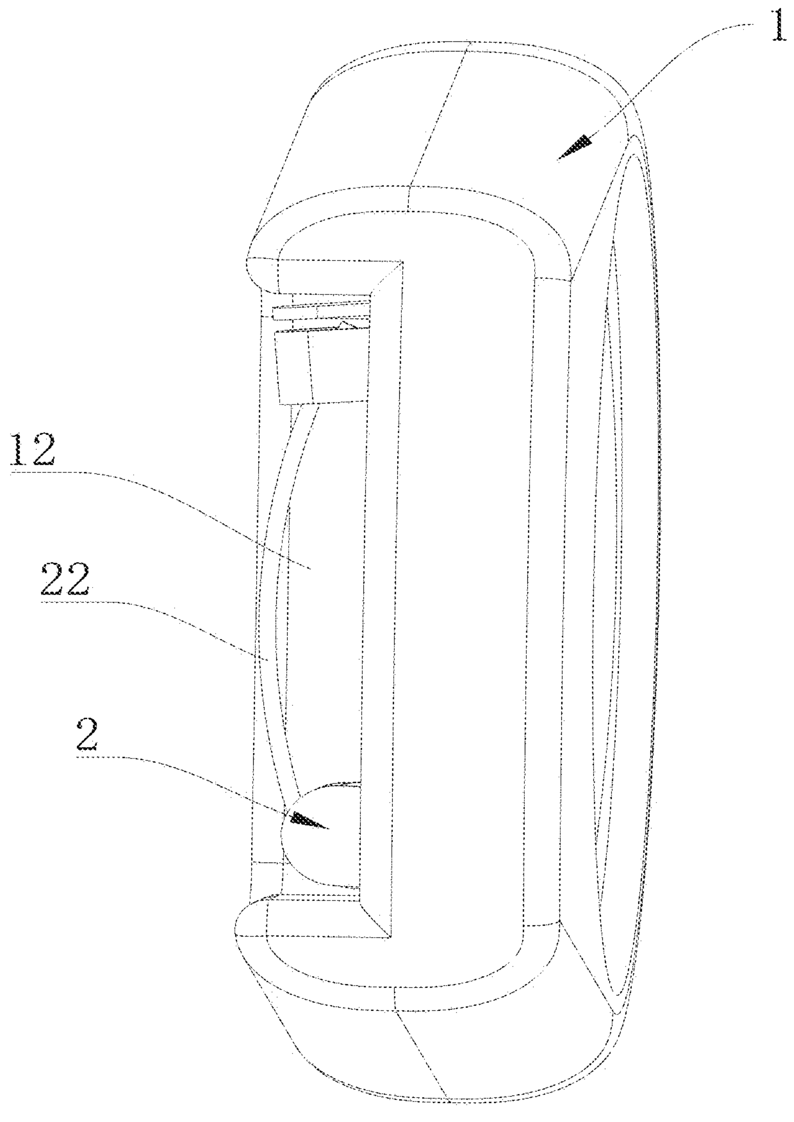

1. housing; 11. mounting groove; 111. mounting cavity; 112. opening; 12. fixing groove; 121. avoidance opening; 13. clamping groove; 2. pin assembly; 21. mounting base; 211. fixing plate; 2111. fixing buckle; 212. mounting seat; 2121. through hole; 2122. connection slot; 2123. pin buckle; 2124. blocking part; 22. pin; 221. spring coil; 222. needle end; 3. wireless positioning device.

DETAILED DESCRIPTION OF THE INVENTION

The technical solutions of embodiments of the present application will be clearly and completely described below with reference to the accompanying drawings of the embodiments of the present application. Obviously, the described embodiments are only a part of the embodiments of the present application, rather than all of the embodiments. Based on the embodiments of the present application, all other embodiments obtained by a person skilled in the art without making creative efforts fall within the protection scope of the present application.

The directional terms mentioned in the present application, such as "upper", "lower", "front", "rear", "left", "right", "inner", "outer", "side", and the like, are merely with reference to the directions shown in the accompanying drawings. Therefore, the directional terms used are for the purpose of illustrating and understanding the present application, rather than limiting the present application. Furthermore, in the drawings, structures that are similar or identical are denoted by the same reference numerals.

The wireless positioning device 3, such as an Air Tag, is widely used for tracking personal belongings, pets, and children due to its compact and portable design. Users typically secure it to the target object via components such as a keychain, cord, pin 22, or the like. However, due to the small device size, an additional protective case is required to ensure secure installation. The pin structure of the existing protective housing is directly exposed outside the housing 1, which increases the overall thickness of the protective device. Meanwhile, the exposed pin structure has sharp ends protruding outwards, posing safety hazards such as scratches and puncture injuries, reducing the usage safety of the protective device and adversely affecting user experience. Therefore, reducing the thickness of the protective shell and enhancing its safety are crucial for improving the safety and convenience of the device.

To this end, an embodiment of the present application provides a protection apparatus for wireless positioning device, solving the problem that the existing protection apparatus for wireless positioning device 3 has a relatively large overall thickness and low safety. By providing a mounting groove 11 and a fixing groove 12 on the housing 1, the mounting groove 11 is configured to accommodate the wireless positioning device 3, and the fixing groove 12 is configured to install the pin assembly 2, so that the pin assembly 2 is completely contained within the fixing groove 12. The pin assembly 2 and the wireless positioning device 3 do not interfere with each other, preventing the pin assembly 2 from being exposed outside the housing 1, thereby reducing the thickness of the protection apparatus and improving its safety.

In order to better understand the aforementioned technical solution, the following detailed description of the aforementioned technical solution will be provided below with reference to the accompanying drawings and specific embodiments.

Please refer to FIG. 1A to FIG. 6, an embodiment of the present application discloses a protection apparatus for wireless positioning device including: a housing 1 and a pin assembly 2, where the housing 1 is provided with a mounting groove 11 and a fixing groove 12, the mounting groove 11 is configured to accommodate a wireless positioning device 3, the fixing groove 12 is formed by inwardly recessing one side surface of the housing 1; the pin assembly 2 is installed in the fixing groove 12, the pin assembly 2 is used for connecting the housing 1 and other objects.

Specifically, with reference to FIG. 1A to FIG. 6, the wireless positioning device 3 of the present embodiment may be an Air Tag, where the housing 1 and the pin assembly 2 constitute a protective case for the Air Tag, and the protection apparatus for wireless positioning device can be attached to a target object so that the wireless positioning device 3 can obtain positioning information of the target object. The housing 1 is used to protect the wireless positioning device 3, and during use, the housing 1 is fitted around the exterior of the wireless positioning device 3, thereby protecting the wireless positioning device 3 from impact or collision; the pin assembly 2 is used to connect the housing 1 with other objects, i.e., the housing 1 can be attached to a target object via the pin assembly 2, for example, by using the pin assembly 2 to clip the protective device containing the wireless positioning device 3 onto clothing, backpacks, or other articles of the target object, thus facilitating carrying of the wireless positioning device 3.

The housing 1 is provided with a mounting groove 11 and a fixing groove 12. The mounting groove 11 is configured to accommodate the wireless positioning device 3, thereby assembling the wireless positioning device 3 onto the housing 1. The fixing groove 12 is used for assembling the pin assembly 2. The fixing groove 12 is formed by inwardly recessing from one side surface of the housing 1, i.e., the opening 112 of the fixing groove 12 communicates the fixing groove 12 with the exterior of the housing 1, allowing the pin assembly 2 to connect with other objects. The pin assembly 2 is installed within the fixing groove 12 such that the entire pin assembly 2 is located inside the housing 1, preventing the pin assembly 2 from being exposed outside the housing 1, thereby improving the safety of the protection apparatus for wireless positioning device and avoiding the pin assembly 2 scratching or catching on a target object. Meanwhile, positioning the pin assembly 2 inside the housing 1 also reduces the thickness of the protection apparatus for wireless positioning device, preventing the pin assembly 2 from protruding outward from the housing 1, thus enhancing the portability of the protection apparatus for wireless positioning device.

In use, the pin 22 on the pin assembly 2 is opened, inserted through clothing or other articles of the target object, and then closed, thereby connecting the protection apparatus for wireless positioning device with other objects so that the wireless positioning device 3 can be conveniently worn on the target object.

Therefore, in the present embodiment, by providing the mounting groove 11 and the fixing groove 12 on the housing 1 of the protection apparatus for wireless positioning device, the wireless positioning device 3 is installed into the mounting groove 11, and the pin assembly 2 is installed in the fixing groove 12. The housing 1 is connected to other objects via the pin assembly 2, thereby achieving convenient wearing of the wireless positioning device 3. The pin assembly 2 is completely housed within the fixing groove 12, preventing the pin assembly 2 from being exposed outside the housing 1, reducing the thickness of the protection apparatus for wireless positioning device and improving its safety.

Meanwhile, installing the pin assembly 2 within the fixing groove 12 prevents the pin assembly 2 from being exposed or protruding from the surface of the housing 1, making the side of the housing 1 that contacts the target object a flat surface. Thus, when the protection apparatus for wireless positioning device is attached to the target object, it fits more closely against the surface of the target object, improving the stability of attachment and user comfort.

More specifically, the pin 22 on the pin assembly 2 may have any structural configuration capable of hooking onto other objects, and no limitation is imposed herein.

More specifically, the pin assembly 2 may be either an integral structure or a split structure relative to the housing 1, and no limitation is imposed herein.

Figure 2A:
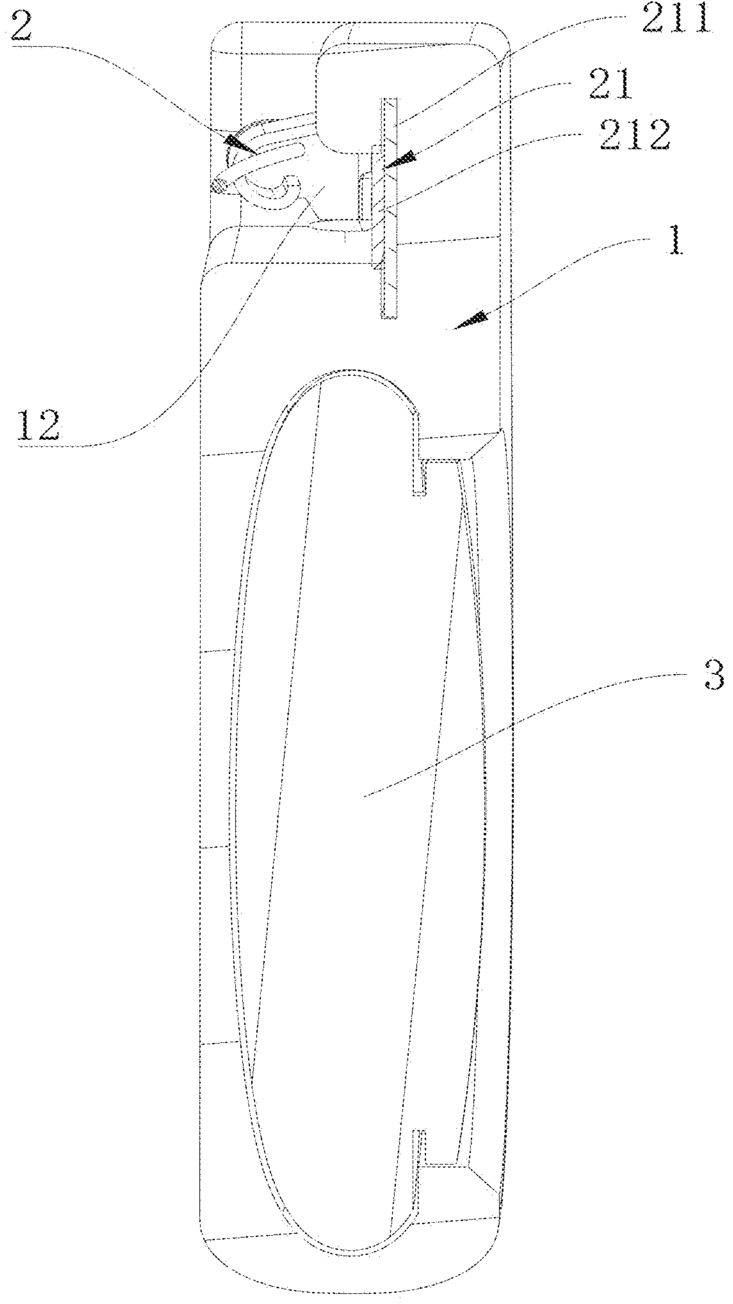
FIG. 2A to FIG. 2B show cross-sectional schematic views of various perspectives of the protection apparatus for wireless positioning device according to an embodiment of the present application.
Figure 2B:
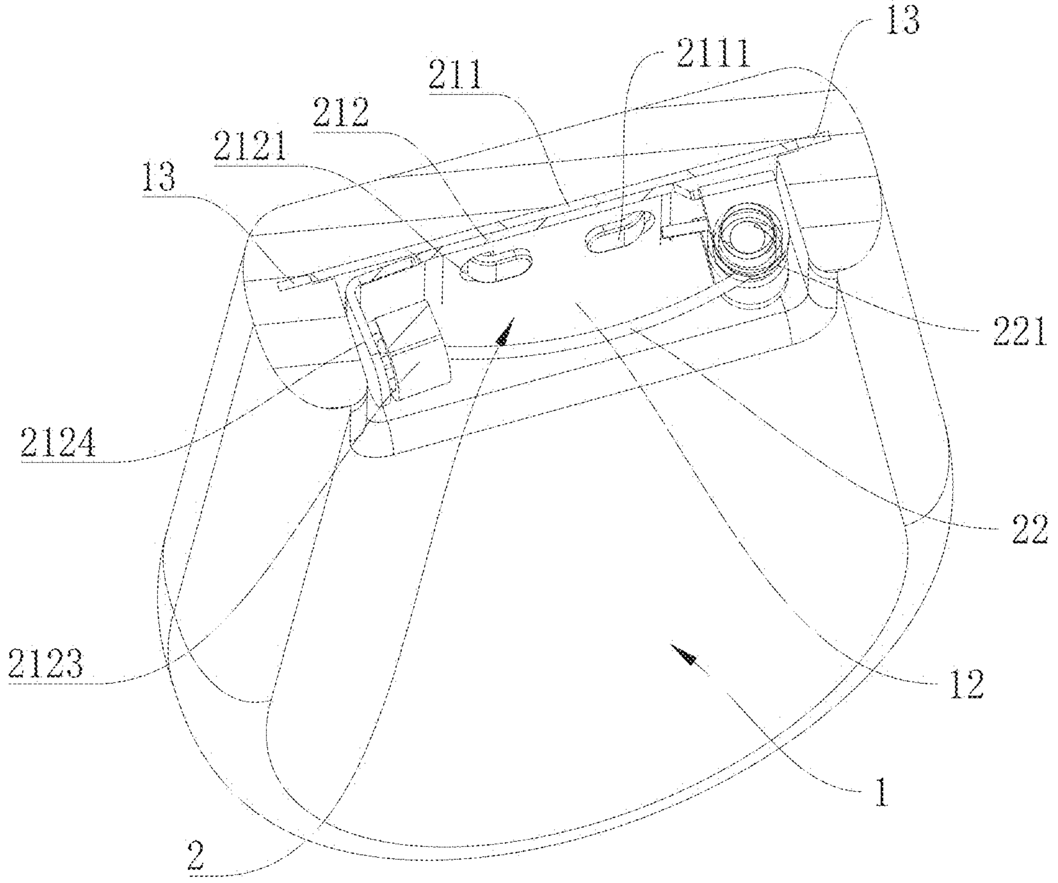
Figure 5:
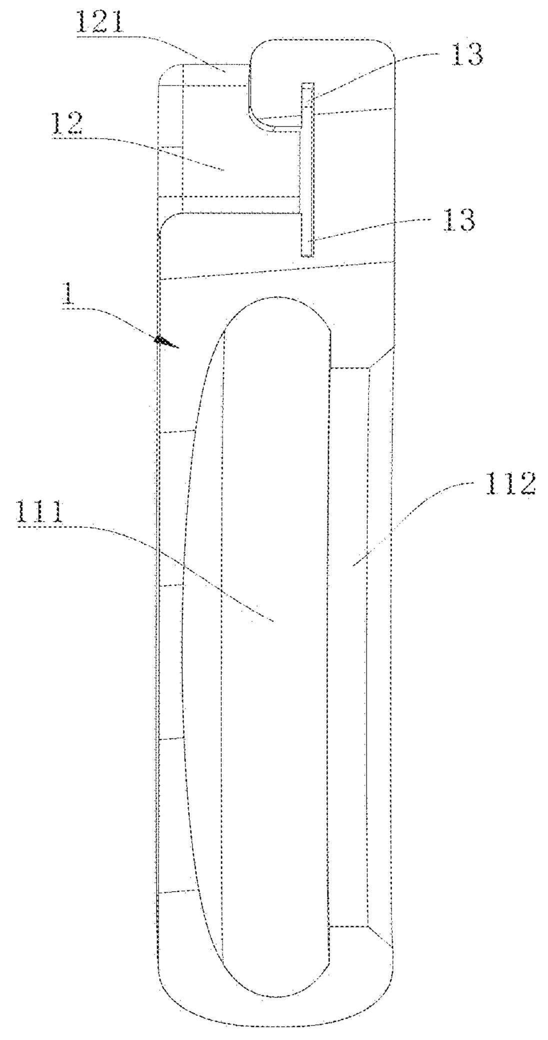
FIG. 5 shows a schematic cross-sectional view of a housing according to an embodiment of the present application.

In one embodiment, with reference to FIG. 2A to FIG. 2B and FIG. 5, the housing 1 further defines a clamping groove 13 communicating with the fixing groove 12. The clamping groove 13 is formed by a recess extending inwardly from a wall of the fixing groove 12 in a direction away from the fixing groove 12, and the clamping groove 13 engages with the pin assembly 2. Specifically, the housing 1 further includes a clamping groove 13, which is configured to engage with the pin assembly 2, thereby achieving connection between the housing 1 and the pin assembly 2. The clamping groove 13 communicates with the fixing groove 12. The clamping groove 13 is formed by a recess extending inwardly from the wall of the fixing groove 12 in a direction away from the fixing groove 12. The position of the clamping groove 13 may be located at the middle or bottom portion of the fixing groove 12 (where the "bottom" refers to the side opposite to the opening 112 of the fixing groove 12). The width of the clamping groove 13 is smaller than the width of the fixing groove 12, facilitating engagement between the clamping groove 13 and the pin assembly 2. When installing the pin assembly 2 into the fixing groove 12, the pin assembly 2 is moved into the fixing groove 12 and engaged with the clamping groove 13, thereby achieving assembly of the pin assembly 2 with the housing 1.

In the present embodiment, the clamping groove 13 is provided on the housing 1, so that the pin assembly 2 can be engaged with the clamping groove 13 within the fixing groove 12, thereby achieving a fixed connection between the pin assembly 2 and the housing 1. This assembly method is simple, has a simple structure, and low production cost.

More specifically, the clamping groove 13 may extend inwardly from one side of a sidewall of the fixing groove 12 in a direction away from the fixing groove 12, or may extend inwardly from a bottom wall of the fixing groove 12 in a direction away from the fixing groove 12. The "sidewall" refers to any of the four lateral sides (upper, lower, left, right) of the fixing groove 12, and the "bottom wall" refers to the wall of the fixing groove 12 opposite to its opening 112; no limitation is imposed herein.

In a specific embodiment, with reference to FIG. 2A to FIG. 2B and FIG. 5, the housing 1 is provided with two clamping grooves 13 oppositely provided on both sides of the fixing groove 12 respectively, and the two clamping grooves are respectively engaged with edge portions on both sides of the pin assembly 2. Specifically, the housing 1 is provided with two clamping grooves 13, provided oppositely, meaning that the two clamping grooves 13 are located on two sides of the fixing groove 12. If one clamping groove 13 is located on an upper side of the fixing groove 12, the other is located on the lower side; if one clamping groove 13 is located on the left side of the fixing groove 12, the other is located on the right side. At this time, the two clamping grooves 13 extend inwardly from opposite sides of the fixing groove 12 in opposite directions. If the two clamping grooves 13 are located on the upper and lower sides of the fixing groove 12, respectively, the upper clamping groove 13 extends upwardly from its end connected to the fixing groove 12, while the lower clamping groove 13 extends downwardly from its end connected to the fixing groove 12, resulting in opposite extension directions. If the two clamping grooves 13 are located on the left and right sides of the fixing groove 12, respectively, the left clamping groove 13 extends leftward from its end connected to the fixing groove 12, while the right clamping groove 13 extends rightward from its end connected to the fixing groove 12, again resulting in opposite extension directions. At this time, the two clamping grooves 13 are engaged with the two opposite lateral edges of the pin assembly 2, thereby achieving a fixed connection between the housing 1 and the pin assembly 2.

In the present embodiment, two oppositely provided clamping grooves 13 engage the opposite sides of the pin assembly 2, improving the stability and firmness of the engagement between the clamping grooves 13 and the pin assembly 2, preventing the pin assembly 2 from shaking or becoming unstable within the fixing groove 12, and enhancing the structural stability of the protection apparatus for wireless positioning device.

In one embodiment, with reference to FIG. 2A to FIG. 2B, the clamping grooves 13 are circumferentially provided around a periphery of the fixing groove 12, and engages with the edge of the pin assembly 2. Specifically, the clamping grooves 13 are provided circumferentially around a periphery of the fixing groove 12, such that clamping grooves 13 are provided on all four sides (upper, lower, left, right) of the fixing groove 12 and communicate with the fixing groove 12. When the pin assembly 2 is installed into the fixing groove 12, the all four edges (upper, lower, left, right) of the pin assembly 2 are engaged by the clamping grooves 13, so that the entire periphery of the pin assembly 2 is engaged by the clamping grooves 13, further improving the connection stability and firmness between the housing 1 and the pin assembly 2, resulting in higher structural stability of the protection apparatus for wireless positioning device.

More specifically, the clamping groove 13 may also be provided on a bottom wall of the fixing groove 12 and formed by an inward recess from the bottom wall. At this time, the clamping groove 13 may engage with a protrusion on the pin assembly 2 to achieve assembly of the pin assembly 2 with the housing 1, facilitating assembly.

In a specific embodiment, the fixing groove 12 has a groove width of L1, and a distance from a top end of the clamping groove 13 above the fixing groove to a bottom end of the clamping groove 12 below the fixing groove 12 is L2, where L1 and L2 satisfy: 10%<L1/L2<88%. Specifically, the width of the fixing groove 12 is L1, i.e., the distance from the upper end to the lower end of the fixing groove 12 is L1. The distance from the top end of the clamping groove 13 on the upper side of the fixing groove 12 to the bottom end of the clamping groove 13 on the lower side of the fixing groove 12 is L2. That is, clamping grooves 13 are provided on both the upper and lower sides of the fixing groove 12. The clamping groove 13 on the upper side extends upwardly, and the clamping groove 13 on the lower side extends downwardly, with both clamping grooves 13 communicating with the fixing groove 12. At this time, the distance between the top end of the upper clamping groove 13 and the bottom end of the lower clamping groove 13 is L2. To achieve better engagement with the pin assembly 2, L1 and L2 must satisfy 10%<L1/L2<88%, ensuring stable engagement of the pin assembly 2 by the clamping grooves 13.

In one embodiment, with reference to FIG. 5, the mounting groove 11 includes a mounting cavity 111 and an opening 112, the mounting cavity 111 is located inside the housing 1, and the opening 112 communicates the mounting cavity 111 with an exterior of the housing 1. Specifically, the mounting groove 11 includes the mounting cavity 111 and the opening 112. Both the mounting cavity 111 and the opening 112 are connected to the wireless positioning device 3. The mounting cavity 111 is located inside the housing 1 and constitutes a main part of the mounting groove 11. Its size and shape are precisely matched to the outer profile of the wireless positioning device 3, serving to accommodate and positionally limit the wireless positioning device 3, preventing displacement of the device within the housing 1, thereby enabling better installation of the wireless positioning device 3 and improving the protective capability of the housing 1 for the wireless positioning device 3. The opening 112 extends inwardly from one side of the housing 1 toward the mounting cavity 111, enabling communication between the mounting cavity 111 and the external space of the housing 1. It serves as both a passage for inserting the wireless positioning device 3 into the mounting cavity 111 and allows signal transmission or operational interaction between the device and the exterior.

During assembly of the wireless positioning device 3 and the protection apparatus, the wireless positioning device 3 is gradually pushed into the mounting cavity 111 through the opening 112 until the device is completely inside the mounting cavity 111. At this point, a stable connection is formed between the device and the mounting cavity 111, with the mounting cavity 111 providing dual radial and axial positioning for the device. Meanwhile, the opening 112 remains in communication with both the mounting cavity 111 and the exterior of the housing 1, completing the installation and fixation of the device while not affecting its ability to interact wirelessly with the outside through the opening 112, ensuring normal operation of positioning function of the device. The overall structural design of the mounting groove 11 achieves a reliable connection between the wireless positioning device 3 and the housing 1, while balancing ease of installation and functional integrity of the device.

More specifically, both the mounting cavity 111 and the opening 112 are annular in structure, making them better conform to the shape of the wireless positioning device 3. The mounting cavity 111 and the opening 112 are assembled with the wireless positioning device 3 via interference fit, improving installation efficiency and reducing costs.

More specifically, the diameter of the opening 112 is smaller than the diameter of the mounting cavity 111, thereby causing the portion of the wireless positioning device 3 located within the mounting cavity 111 to be securely engaged therein, further improving the connection stability and firmness between the mounting groove 11 and the wireless positioning device 3, and reducing the risk of the wireless positioning device 3 detaching from the protection apparatus for wireless positioning device.

In one embodiment, the area S1 of the opening 112 and the area S2 of the mounting cavity 111 satisfy: 10%<S1/S2<93%. Specifically, the area S1 of the opening 112 refers to the cross-sectional area S1 at the opening 112 of the mounting groove 11, which is a parameter measuring the size of the channel for inserting/removing the device into/from the mounting cavity 111, directly affecting the convenience of handling the wireless positioning device 3. The area S2 of the mounting cavity 111 refers to the internal cross-sectional area of the mounting cavity 111, reflecting the space available for accommodating the wireless positioning device 3, which must match the dimensions of device to ensure installation stability. The opening 112 and the mounting cavity 111 of the mounting groove 11 are machined according to a predetermined shape (e.g., circular, rectangular), and their area parameters are strictly set according to a ratio relationship 10%<S1/S2<93% to balance the convenience of installing the wireless positioning device 3 and the reliability of fixation.

A design of the ratio S1/S2 in the present embodiment avoids excessive S1/S2 ratios (e.g., ≥93%) that could lead to easy detachment of the wireless positioning device 3 from the mounting cavity 111 (as the opening 112 approaches the size of the mounting cavity 111, limiting effect weakens), and prevents installation difficulties caused by too small an opening 112 (e.g., ≤10%, where the opening 112 is too narrow to allow smooth insertion). Meanwhile, a reasonable area ratio ensures adequate envelopment of the wireless positioning device 3 by the mounting cavity 111, reducing the impact of external shocks on the device, thus balancing structural practicality and device protection.

In a specific embodiment, a radius R1 of the opening 112 and a radius R2 of the mounting cavity 111 satisfy: 20%<R1/R2<90%. Specifically, the opening 112 and the mounting cavity 111 of the mounting groove 11 are both designed with a circular structure. The radius R1 of the opening 112 is smaller than the radius R2 of the mounting cavity 111, and must satisfy 20%<R1/R2<90%. This ratio design avoids excessive R1 (e.g., R1/R2≥90%), which would weaken the limiting effect and increase the risk of the wireless positioning device 3 detaching, and prevents installation difficulties due to excessively small R1 (e.g., R1/R2≤20%), where the opening 112 is too narrow for smooth insertion. Ultimately, this achieves a balance between installation convenience and fixation reliability, enabling precise mating between the opening 112 and the mounting cavity 111 and improving the structural stability of the housing 1.

More specifically, when the wireless positioning device 3 needs to be frequently removed and reinstalled, the R1/R2 ratio may be selected in the larger range of 70%-90% to reduce insertion/removal resistance. When the wireless positioning device 3 needs to be fixed long-term, the ratio may be controlled between 20%-50%, narrowing the opening 112 to enhance the positioning effect on the device. Meanwhile, the edge of the opening 112 must smoothly transition to the inner wall of the mounting cavity 111, avoiding step structures caused by abrupt radius changes, ensuring that the wireless positioning device 3 is not obstructed during insertion or removal.

In one embodiment, with reference to FIG. 1A to FIG. 5, the opening 112 of the mounting groove 11 and the opening of the fixing groove 12 are located on opposite sides of the housing 1. Specifically, during manufacturing of the housing 1, the mounting groove 11 and the fixing groove 12 are pre-formed, with their openings located on opposite sides of the housing 1. The mounting groove 11 is designed according to the specifications of the wireless positioning device 3. Its opening 112 is formed on one side surface of the housing 1, and the internal mounting cavity 111 communicates with the opening 112, used for accommodating the wireless positioning device 3 and enabling insertion and removal of the wireless positioning device 3 through the opening 112. The fixing groove 12 is formed on the other side surface of the housing 1 opposite to the opening 112 of the mounting groove 11, used for installing the pin assembly 2.

The positional design of the mounting groove 11 and the fixing groove 12 ensures they are oppositely distributed on the housing 1, avoiding mutual space occupation or functional interference. The mounting groove 11 focuses on accommodating and securing the device, while the fixing groove 12 focuses on installing the pin assembly 2. Because their openings face oppositely, external influences on their internal structures are reduced. This layout not only optimizes the utilization efficiency of the space within the housing 1, but also ensures the functional independence of the mounting groove 11 and the fixing groove 12 through a separated design, thereby enabling coordinated implementation of the fixation and protection functions of the wireless positioning device 3.

In a specific embodiment, with reference to FIG. 1A to FIG. 5, the fixing groove 12 is located at a top of the housing 1, and the mounting groove 11 is positioned below the fixing groove 12. Specifically, the fixing groove 12 is formed at the top of the housing 1, and the mounting groove 11 is provided below the fixing groove 12. Together, they form a vertically distributed spatial structure inside the housing 1. This vertical layout utilizes the housing 1 space longitudinally. The fixing groove 12 and the mounting groove 11 independently perform their respective functions: the top location of the fixing groove 12 facilitates fixing the housing 1 to external items, while the lower-positioned mounting groove 11 stably accommodates the wireless positioning device 3. Through the structure of the housing 1, they form an organic whole, ensuring both operational convenience of the pin assembly 2 and installation stability of the wireless positioning device 3, while avoiding space wastage due to structural overlap, thereby further reducing the thickness of the protection apparatus for wireless positioning device.

More specifically, the direction of the opening 112 of the mounting groove 11 and the opening direction of the fixing groove 12 may be designed according to usage requirements (for example, the opening 112 of the fixing groove 12 faces upward to facilitate operation of the pin 22, while the opening 112 of the mounting groove 11 faces downward or laterally to facilitate device placement and removal), but their vertical positional relationship remains fixed.

More specifically, a certain thickness of a wall of the housing 1 is maintained between the groove bodies of the mounting groove 11 and the fixing groove 12, which avoids structural interference and enhances overall strength.

In one embodiment, with reference to FIG. 1A to FIG. 5, an avoidance opening 121 is provided at a top of the fixing groove 12, and the avoidance opening 121 communicates the interior of the fixing groove 12 with outside. Specifically, the avoidance opening 121 is provided at the top of the fixing groove 12, extending upward from an upper groove wall of the fixing groove 12, thereby establishing communication between the fixing groove 12 and the exterior space of the housing 1. The avoidance opening 121 serves to connect the interior of the fixing groove 12 with the outside, providing operational space or motion pathways for movable parts of the pin assembly 2.

The position of the avoidance opening 121 corresponds to a movable end of the pin assembly 2 within the fixing groove 12, ensuring that the movable part of the pin assembly 2 (such as the tip or pressing portion of the pin 22) can extend outward through the avoidance opening 121 or perform rotational or telescopic movements within the groove.

When the pin assembly 2 is installed in the fixing groove 12, its fixed end is connected to the fixing groove 12 via snap-fit structures or shaft features inside the groove, while the movable end aligns with the position of the avoidance opening 121. During use of the pin assembly 2 to secure the housing 1, a user can operate the movable end of the pin assembly 2 (e.g., by pressing or flipping) through the avoidance opening 121, causing the pin assembly 2 to extend out from the fixing groove 12 and penetrate through external items (such as clothing or backpack straps). After securing, the movable end is retracted back into the fixing groove 12, where the avoidance opening 121 allows partial or full entry of the movable end into the groove, reducing exposed area.

The provision of the avoidance opening 121 ensures both the storage requirement of the pin assembly 2 within the fixing groove 12 and, through its structure connecting interior and exterior spaces, enables operation of the pin assembly 2 without being constrained by the enclosed space of the fixing groove 12. At the same time, it avoids safety risks and increased thickness caused by complete exposure of the pin assembly 2, achieving a balance between structural compactness and usability convenience.

In a specific embodiment, the pin assembly 2 and the housing 1 are of a split structure. Specifically, the pin assembly 2 and the housing 1 are not integrally formed. Instead, they are independently manufactured according to preset specifications. After independent fabrication, the pin assembly 2 and the housing 1 are assembled: a connection end of the pin assembly 2 is aligned with a mating structure inside the fixing groove 12 of the housing 1, and the two components are joined by engagement using the clamping groove 13, enabling either detachable or non-detachable connection depending on design requirements. After assembly, the pin assembly 2 can move along a predefined path within the fixing groove 12, achieving the function of extending for fixation—retracting for storage, while the housing 1 provides stable support and protection for the pin assembly 2. Although manufactured separately, the two components work together to meet the external attachment needs of the housing 1.

Such split structure design allows the pin assembly 2 and the housing 1 to be made of different materials (e.g., metal for the pin assembly 2 to enhance strength, plastic for the housing 1 to reduce weight), enables optimization of respective manufacturing processes (e.g., precision stamping for the pin assembly 2, injection molding for the housing 1), and facilitates maintenance, if the pin assembly 2 is damaged, it can be replaced individually without replacing the entire housing 1, thereby enhancing practicality and cost-effectiveness.

In one embodiment, the portion of the housing 1 where the fixing groove 12 is located is made of soft material. Specifically, the term "soft material" refers to materials possessing certain elasticity, flexibility, and deformability (such as silicone, TPU thermoplastic polyurethane, soft PVC, etc.), which can undergo moderate deformation under force and return to their original shape after the force is removed, while also exhibiting good wear resistance and anti-aging properties, suitable for structures requiring buffering or adaptation to moving parts. By making the region of the housing 1 where the fixing groove 12 is located from soft material, the groove walls can moderately deform during installation of the pin assembly 2 into the fixing groove 12, reducing assembly difficulty; meanwhile, the elastic recovery force generated by deformation tightly wraps around the pin assembly 2, reducing looseness. When the pin assembly 2 moves (e.g., extends or retracts), the soft material prevents rigid friction between the pin 22 and the groove, reduces wear, and minimizes operational resistance through elastic cushioning. Additionally, the soft material improves tactile sensation in the fixing groove 12 area, avoiding sharpness potentially caused by hard materials, and provides certain buffering protection for the pin assembly 2 when the housing 1 experiences minor impacts, balancing practicality with user experience.

More specifically, the housing 1 adopts a "locally differentiated material" design, meaning that soft material is used only at an area where the fixing groove 12 is located, while hard material structure is retained at other areas, thus reducing production costs.

In another embodiment, the housing 1 is entirely made of soft material, i.e., the entire housing 1 is of a soft structure, facilitating installation and removal of the pin assembly 2 and the wireless positioning device 3, improving the feel and abrasion resistance of the protection apparatus for wireless positioning device, and enhancing the protective capability of the protection apparatus for the wireless positioning device 3.

In one embodiment, the pin assembly 2 and the housing 1 are of an integral structure. Specifically, the pin assembly 2 and the housing 1 are formed as an inseparable whole through the same manufacturing process, using techniques such as insert molding or full plastic molding. This integral structure does not need subsequent assembly procedures, avoids loosening issues caused by assembly gaps in split structures, enhances the connection strength between the pin assembly 2 and the housing 1, reduces the risk of detachment during long-term use, and lowers the probability of contaminants entering the interior of the housing 1 due to the absence of assembly gaps, providing more comprehensive protection for the wireless positioning device 3. It also simplifies the production process and improves overall production efficiency.

In a specific embodiment, with reference to FIG. 2A to FIG. 3 and FIG. 6, the pin assembly 2 includes a mounting base 21 and a pin 22, where the mounting base 21 is fixedly connected to the housing 1, one end of the pin 22 is fixedly connected to the mounting base 21, and the other end is detachably connected to the mounting base 21. Specifically, the pin assembly 2 includes a mounting base 21 and a pin 22. The mounting base 21 serves as the base component of the pin assembly 2, used to connect the housing 1 and the pin 22. It is typically plate-shaped or block-shaped, equipped with structures for fixing to the housing 1 and connection points for the pin 22, playing a role in load-bearing and positioning. The pin 22 is the movable component of the pin assembly 2, bar-shaped, with one end fixed to the mounting base 21 and the other end separable from or combinable with the mounting base 21, enabling fixation by penetrating through external items.

One side of the mounting base 21 is fixedly connected to the housing 1. In the present embodiment, one side of the mounting base 21 is fixedly connected to a bottom wall of the fixing groove 12, where the bottom wall refers to the side wall of the fixing groove 12 opposite to its opening 112. The pin 22 is made of a metal or high-strength plastic with certain elasticity. One end of the pin 22 is fixedly connected to one end of the mounting base 21 via riveting, welding, or integral molding, forming a non-movable fixed end. The other end of the pin 22 is a needle end 222, and a buckle is provided at the corresponding position on the mounting base 21, allowing the needle end 222 to form a detachable connection with the mounting base 21.

When securing the housing 1, the needle end 222 of the pin 22 is operated to separate it from the mounting base 21. The pin 22 rotates about the fixed end, the pin body penetrates through an external item (e.g., clothing or backpack strap), then the needle end 222 is pressed back into the buckle on the mounting base 21, achieving fixation through locking engagement. For disassembly, an external force is applied to release the needle end 222 of the pin 22 from the buckle, and rotating the pin 22 allows removal of the housing 1. The fixed connection between the mounting base 21 and the housing 1 ensures overall stability of the pin assembly 2. The combination of fixed and detachable connections between the two ends of the pin 22 and the mounting base 21 achieves reliable fixation functionality while ensuring operational convenience, enabling rapid attachment and detachment of the housing 1 from external items.

In one embodiment, with reference to FIG. 2A to FIGS. 3 and 6, the mounting base 21 includes a fixing plate 211 and a mounting seat 212, where the fixing plate 211 is fixedly connected to the housing 1, the mounting seat 212 is fixedly provided on the fixing plate 211, one end of the mounting seat 212 is fixedly connected to one end of the pin 22, and the other end of the mounting seat 212 is detachably connected to the other end of the pin 22. Specifically, the mounting base 21 includes a fixing plate 211 and a mounting seat 212. The fixing plate 211 is the base component of the mounting base 21, plate-shaped or block-shaped, directly contacting and fixed to the housing 1, required to have sufficient structural strength to bear the weight of the mounting seat 212 and pin 22 as well as external forces during use, ensuring overall connection stability. The mounting seat 212 is the functional component of the mounting base 21, fixedly mounted on the fixing plate 211, specifically designed for connecting the pin 22. Its two ends are respectively designed with structures adapted to the fixed and detachable connections of the pin 22, serving as the key part enabling fixation and mobility functions of the pin 22.

The fixing plate 211 is fixedly connected to the housing 1. In the present embodiment, the edge of the fixing plate 211 is engaged with the clamping groove 13 to achieve fixation between the fixing plate 211 and the housing 1, with one side of the fixing plate 211 abutting against the bottom wall of the fixing groove 12. The mounting seat 212 is fixed on the other side of the fixing plate 211, with one end of the mounting seat 212 fixedly connected to one end of the pin 22, and the other end of the mounting seat 212 detachably connected to the other end of the pin 22. When using the pin 22 to secure the housing 1, an external force is applied to the needle end 222 of the pin 22 to disengage it from the locking structure at the detachable end of the mounting seat 212. The pin 22 rotates about the fixed end, the pin body penetrates through an external item, then the needle end 222 is aligned with the detachable end of the mounting seat 212 and pressure is applied to achieve locking via snap-fit engagement, magnetic attraction, or similar methods, completing the fixation of the housing 1 to the external item; disassembly is achieved by reversing this process.

In the entire structure, the fixing plate 211 bears the function of connecting and fixing to the housing 1, while the mounting seat 212 focuses on installing the pin 22 and limiting its movement. Together, they enable stable installation and flexible use of the pin assembly 2, ensuring reliability during fixation and convenience during operation of the pin 22.

Figure 6:
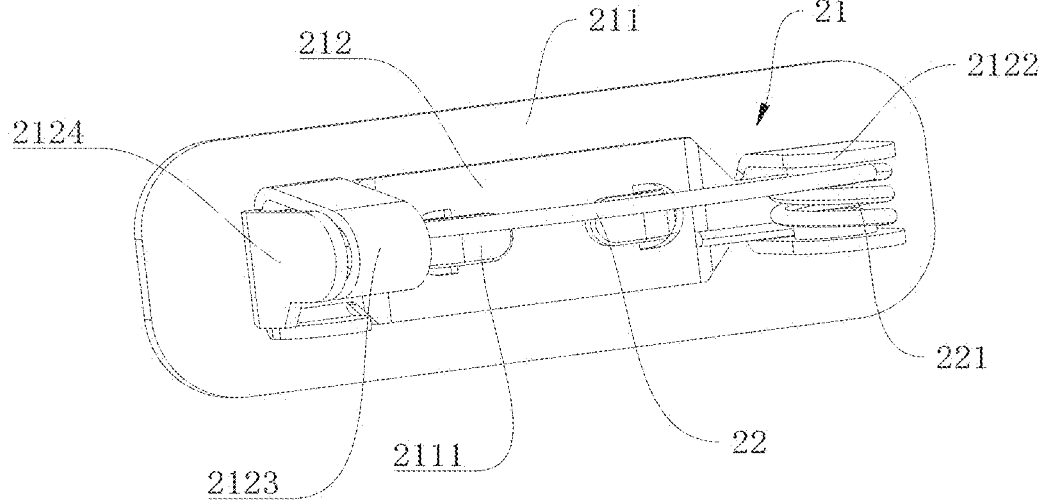
FIG. 6 shows a schematic structural diagram of a pin assembly according to an embodiment of the present application.

In a specific embodiment, with reference to FIG. 6, the fixing plate 211 is provided with a fixing buckle 2111, the mounting seat 212 is provided with a through hole 2121, and the through hole 2121 engages with the fixing buckle 2111 to achieve fixation. Specifically, the fixing plate 211 is provided with a fixing buckle 2111, which is located on one side surface of the fixing plate 211 and protrudes with certain elasticity, capable of elastic deformation under external force and rebounding to engage with the through hole 2121, achieving detachable fixation. The mounting seat 212 is provided with a through hole 2121, which is formed on the mounting seat 212 with shape and size matching the fixing buckle 2111, designed to accommodate the fixing buckle 2111 and prevent its detachment through sidewall constraint, thereby fixing the mounting seat 212 to the fixing plate 211.

During assembly, the mounting seat 212 is aligned with a preset position on the fixing plate 211 so that the through hole 2121 faces the fixing buckle 2111 directly. Pressure is applied to push the mounting seat 212 toward the fixing plate 211. At this moment, the fixing buckle 2111 is squeezed by the entrance of the through hole 2121 and elastically deforms, allowing the fixing buckle 2111 to enter the through hole 2121. Once the fixing buckle 2111 is fully embedded in the through hole 2121, it returns to its original shape due to elasticity, with its end surface contacting the stop surface of the through hole 2121, forming axial limitation, while the two side walls of the through hole 2121 restrict lateral movement of the fixing buckle 2111, firmly connecting the mounting seat 212 and the fixing plate 211 through engagement.

If disassembly is needed, a reverse pulling force is applied to the mounting seat 212, simultaneously causing the fixing buckle 2111 to deform again under pressure from the stop surface of the through hole 2121, allowing it to disengage from the through hole 2121 and separate the two components.

Such engagement structure requires no additional fasteners. Through precise cooperation between the fixing buckle 2111 and the through hole 2121, it ensures stable connection between the fixing plate 211 and the mounting seat 212, simplifies assembly and disassembly processes, makes maintenance and replacement of the pin assembly 2 more convenient, and avoids structural redundancy caused by screws or similar components.

In one embodiment, with reference to FIG. 6, the fixing plate 211 is provided with two spaced-apart fixing buckles 2111, with the ends of the two fixing buckles 2111 extending toward each other, and the mounting seat 212 is provided with two spaced-apart through holes 2121, each engaging with one of the fixing buckles 2111. Specifically, the fixing plate 211 is provided with two fixing buckles 2111, spaced apart, with their ends extending toward each other, i.e., the ends of the two fixing buckles 2111 extend in directions approaching each other, forming a mutually facing layout that enhances stability after engagement. The mounting seat 212 is provided with two spaced-apart through holes 2121, each corresponding to one of the fixing buckles 2111.

During assembly, the two through holes 2121 of the mounting seat 212 are aligned with the two fixing buckles 2111 of the fixing plate 211, and pressure is applied to move the mounting seat 212 toward the fixing plate 211 until the fixing buckles 2111 engage with the through holes 2121.

In the present embodiment, the two oppositely extending fixing buckles 2111 exert symmetrical constraining forces on the mounting seat 212 after engagement, preventing horizontal displacement or wobbling of the mounting seat 212, while gap fit between the through holes 2121 and the fixing buckles 2111 limits radial movement of the mounting seat 212. Such structure, through corresponding engagement of dual buckles and dual through holes 2121, significantly enhances connection strength, ensuring the mounting seat 212 does not easily detach from the fixing plate 211 under load, while utilizing the elasticity of the fixing buckles 2111 to allow simple assembly and disassembly operations without additional tools, balancing connection stability with operational convenience.

Figure 3:
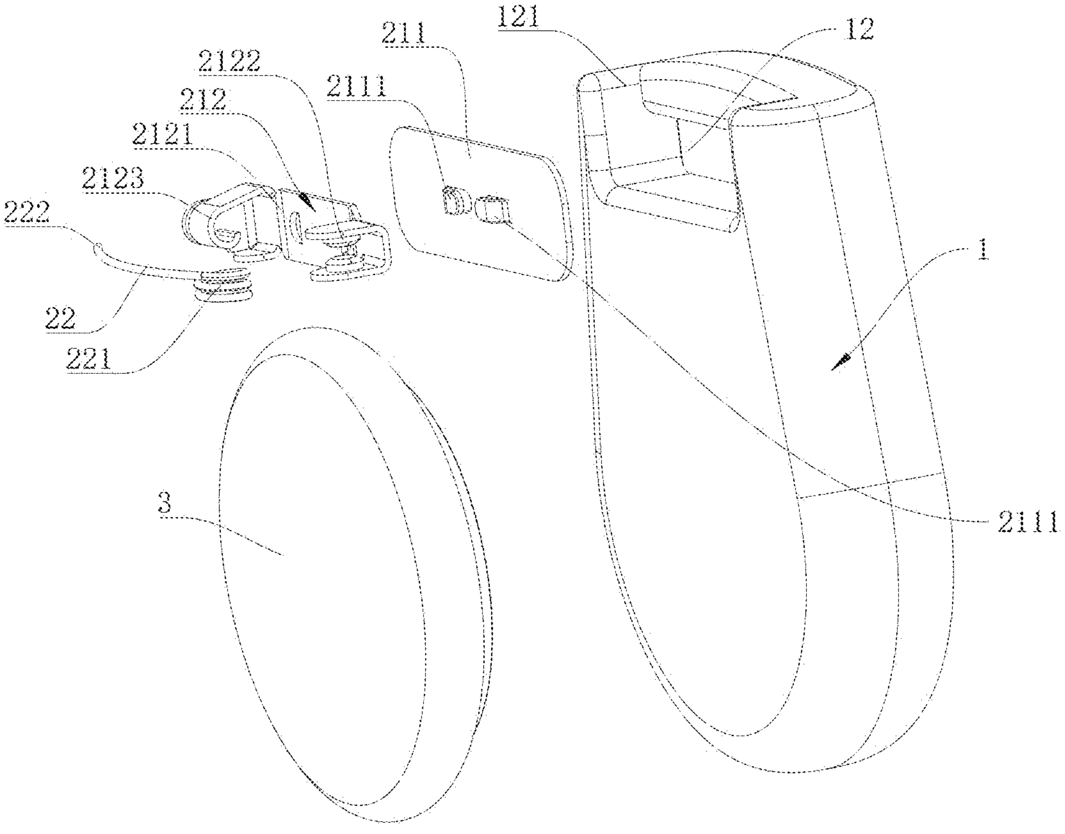
FIG. 3 shows an exploded schematic diagram of a protection apparatus for wireless positioning device according to an embodiment of the present application.
Figure 4A:
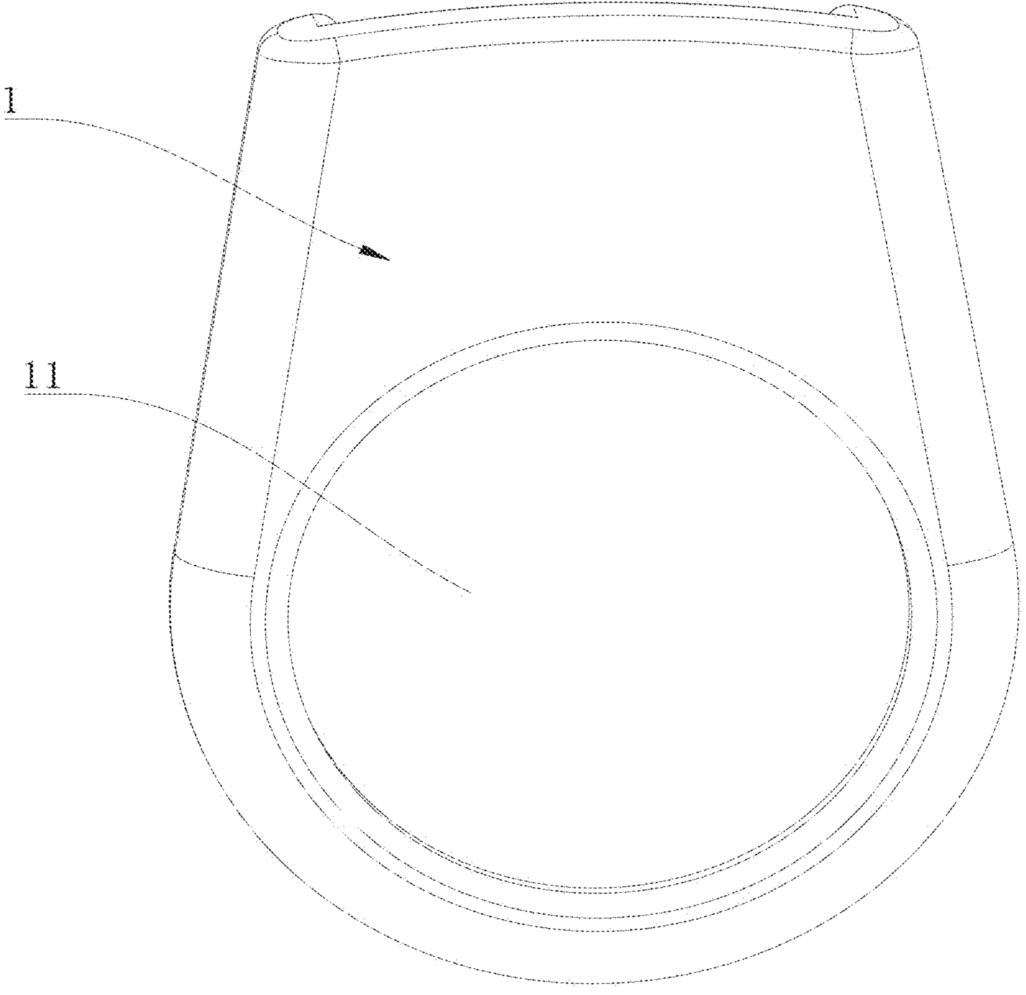
FIG. 4A to FIG. 4C are schematic structural diagrams of a housing according to an embodiment of the present application from different viewpoints.
Figure 4B:
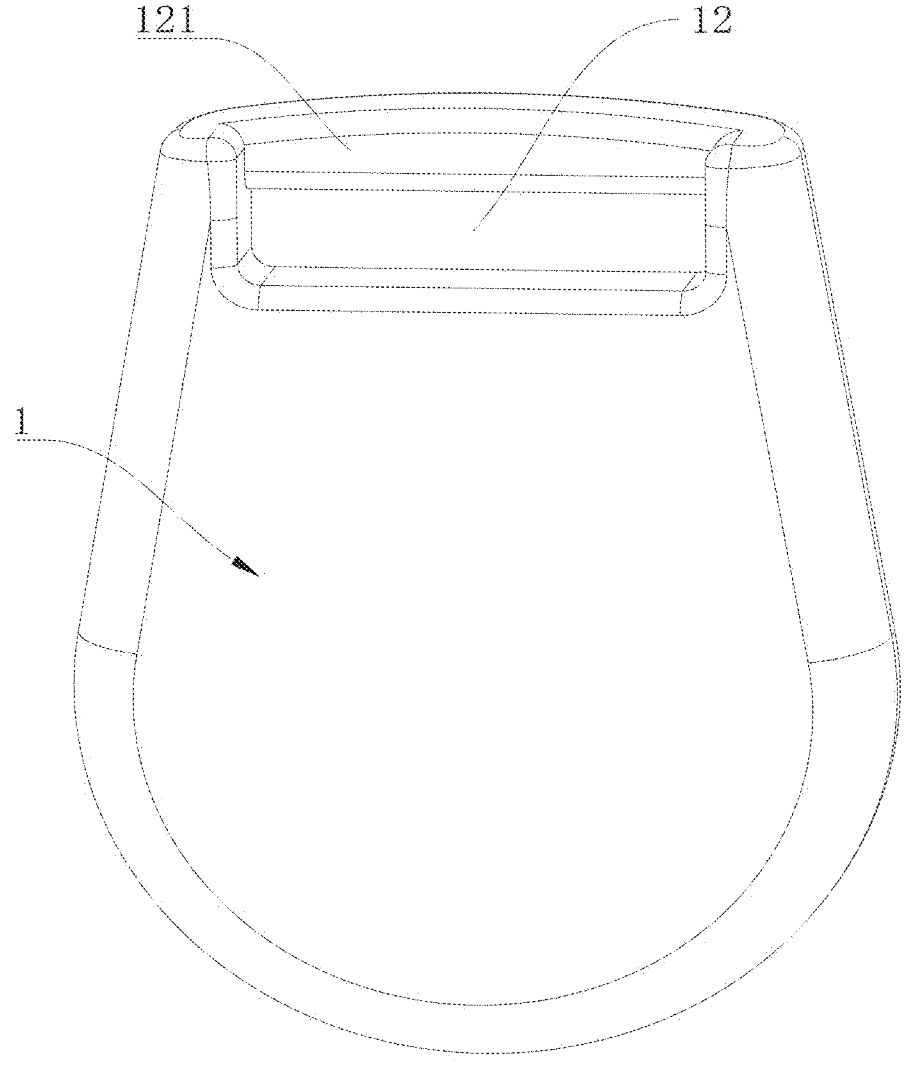
Figure 4C:
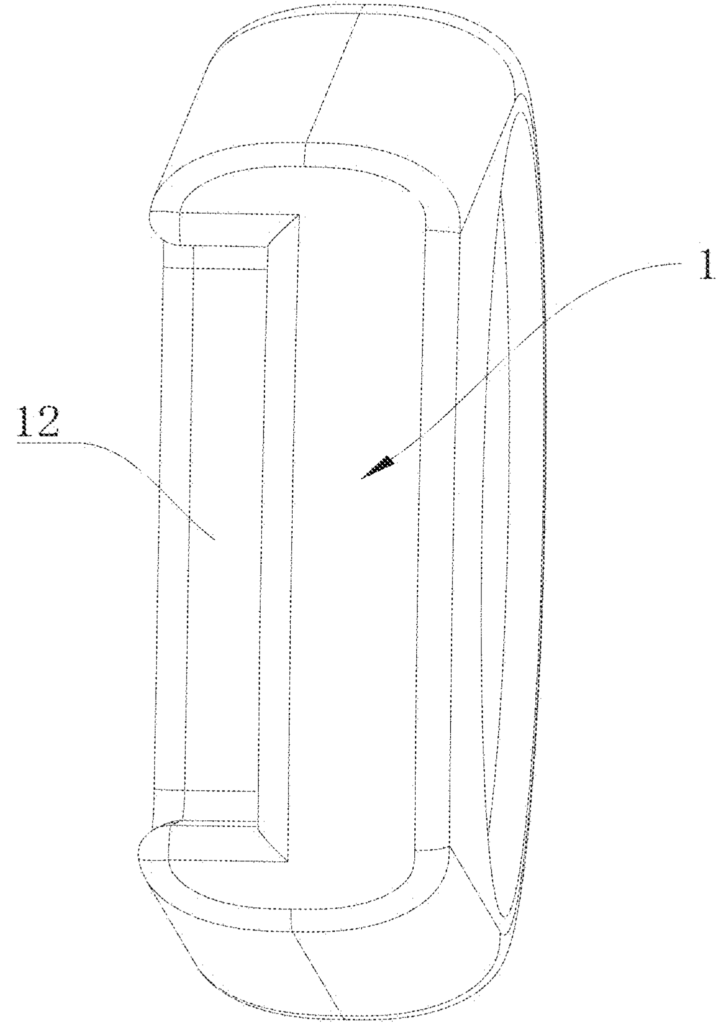

In one embodiment, with reference to FIG. 3 and FIG. 6, one end of the pin 22 is provided with a spring coil 221 and the other end is a needle end 222, where the spring coil 221 is fixedly connected to one end of the mounting seat 212, and the needle end 222 is detachably connected to the other end of the mounting seat 212. Specifically, one end of the pin 22 is provided with a spring coil 221, which is a ring-shaped elastic structure formed by bending metal wire, possessing the characteristic of automatically returning to its original shape after deformation. It serves as the fixed connection point between the pin 22 and the mounting seat 212 and provides rotational resilience for the pin 22. The other end of the pin 22 is the needle end 222, i.e., a sharp structure used to penetrate external items and form a detachable connection with the mounting seat 212, serving as the critical end for achieving fixation. During installation, the spring coil 221 is fixedly connected to one end of the mounting seat 212, and the needle end 222 is detachably connected to the other end of the mounting seat 212.

When securing the housing 1, an external force overcomes the resilience of the spring coil 221, causing the pin 22 to rotate about its pivot, moving the needle end 222 away from the mounting seat 212 and penetrating through an external item. Then, upon releasing the external force, the spring coil 221 rebounds, driving the pin 22 to reset, and the needle end 222 compresses the connecting portion of the mounting seat 212, causing elastic deformation to form a stable detachable connection. During disassembly, an external force causes the pin 22 to rotate in reverse, detaching the needle end 222 from the mounting seat 212, the spring coil 221 deforms again to store energy, and upon removal of the external force, drives the pin 22 back to its initial position.

Such structure enables elastic reset of the pin 22 through the spring coil 221, ensuring that the needle end 222 and the mounting seat 212 are always connected with a preload force in a detachable manner, reducing the risk of accidental detachment. At the same time, the elasticity of the spring coil 221 simplifies operation, making the opening and closing process of the pin 22 labor-saving and smooth, achieving both fixation reliability and ease of use.

In one embodiment, with reference to FIG. 3 and FIG. 6, one end of the mounting seat 212 is provided with a connection slot 2122, and the other end is provided with a pin buckle 2123. The connection slot 2122 is fixedly connected to the spring coil 221, and the pin buckle 2123 is engaged with the needle end 222. Specifically, one end of the mounting seat 212 is provided with the connection slot 2122, which is configured to accommodate and fix the end of the spring coil 221 of the pin 22, ensuring stable rotation of the pin 22. The other end of the mounting seat 212 is provided with the pin buckle 2123, which is configured for detachable connection with the needle end 222 and serves a locking function. The connection portion is fixedly connected to the spring coil 221, and the pin buckle 2123 is engaged with the needle end 222. When wearing the protection apparatus for wireless positioning device, an external force is applied to the pin 22 to disengage the needle end 222 from the pin buckle 2123, then the needle end 222 is passed through an object (such as clothing or a backpack), and finally force is again applied to the pin 22 to engage and lock the needle end 222 with the pin buckle 2123.

In the present embodiment, the fixed connection between the connection slot 2122 and the spring coil 221 ensures rotational stability of the pin 22, while the engagement between the pin buckle 2123 and the needle end 222 achieves reliable locking of the pin 22. The cooperation of these two features allows the pin 22 to open and close flexibly while remaining stable in the locked state, satisfying the requirement for connecting the housing 1 to external items.

More specifically, the upper and lower side walls of the connection slot 2122 are provided with inwardly protruding raised portions, and the upper and lower ends of the spring coil 221 are respectively fixedly connected to the upper and lower raised portions.

In a specific embodiment, with reference to FIG. 6, the other end of the mounting seat 212 is further provided with a blocking part 2124, which covers the side of the pin buckle 2123 away from the connection slot 2122, and the blocking part 2124 is configured to limit the movement of the needle end 222. Specifically, the other end of the mounting seat 212 is further provided with the blocking part 2124, which limits the range of motion of the needle end 222 and enhances the engagement stability between the needle end 222 and the pin buckle 2123; the blocking part 2124 is provided on the side of the pin buckle 2123 away from the connection slot 2122 and covers one side of the pin buckle 2123. The blocking surface of the blocking part 2124 directly contacts and stops the needle end 222, preventing excessive displacement.

The provision of the blocking part 2124 does not affect normal engagement and disengagement operations between the needle end 222 and the pin buckle 2123, but only functions to limit movement when abnormal displacement of the needle end 222 occurs. Its cover structure can also protect the pin buckle 2123, reducing the risk of jamming caused by foreign matter entering the buckle area. Meanwhile, by limiting the range of motion of the needle end 222, it ensures that the needle end 222 remains effectively engaged with the pin buckle 2123 in the locked state, further improving the connection reliability of the pin assembly 2.

The above descriptions are merely specific implementations of the present application, but the protection scope of the present application is not limited thereto. Any person skilled in the art who, within the technical scope disclosed by the present application, can easily conceive various equivalent modifications or replacements, such modifications or replacements should be covered within the protection scope of the present application. Therefore, the protection scope of the present application shall be subject to the protection scope defined in the claims.

The invention claimed is:

1. A protection apparatus for wireless positioning device, comprising: a housing provided with a mounting groove and a fixing groove, the mounting groove being configured to accommodate the wireless positioning device, and the fixing groove being formed by an inward recess from one side surface of the housing; and a pin assembly installed in the fixing groove, the pin assembly being used to connect the housing and other objects;

wherein the housing is provided with two clamping grooves oppositely provided on both sides of the fixing groove respectively, each clamping groove being formed by a recess extending inwardly from a wall of the fixing groove in a direction away from the fixing groove; the two clamping grooves are communicated with the fixing groove, and the two clamping grooves are respectively engaged with edge portions on both sides of the pin assembly.

2. The protection apparatus for wireless positioning device according to claim 1, wherein the mounting groove comprises a mounting cavity and an opening, the mounting cavity is located inside the housing, and the opening communicates the mounting cavity with an exterior of the housing.

3. The protection apparatus for wireless positioning device according to claim 2, wherein an opening area S1 and a mounting cavity area S2 satisfy: $10\%<S1/S2<93\%$.

4. The protection apparatus for wireless positioning device according to claim 1, wherein an opening of the mounting groove and an opening of the fixing groove are respectively located on opposite sides of the housing.

5. The protection apparatus for wireless positioning device according to claim 1, wherein the fixing groove is provided at a top of the housing, and the mounting groove is provided below the fixing groove.

6. The protection apparatus for wireless positioning device according to claim 1, wherein an avoidance opening is provided at a top of the fixing groove, the avoidance opening communicating an interior of the fixing groove with outside.

7. The protection apparatus for wireless positioning device according to claim 1, wherein the pin assembly and the housing are of a split structure.

8. The protection apparatus for wireless positioning device according to claim 7, wherein the housing at a position where the fixing groove is provided is made of a soft material.

9. The protection apparatus for wireless positioning device according to claim 1, wherein the pin assembly and the housing are of an integral structure.

10. A protection apparatus for wireless positioning device, comprising:

a housing provided with a mounting groove and a fixing groove, the mounting groove being configured to accommodate the wireless positioning device, and the fixing groove being formed by an inward recess from one side surface of the housing; and a pin assembly installed in the fixing groove, the pin assembly being used to connect the housing and other objects;

wherein the pin assembly comprises a mounting base and a pin, the mounting base being fixedly connected to the housing, the pin has one end fixedly connected to the mounting base and the other end detachably connected to the mounting base;

wherein the mounting base comprises a fixing plate and a mounting seat, the fixing plate being fixedly connected to the housing, the mounting seat being fixedly provided on the fixing plate, the mounting seat has one end fixedly connected to one end of the pin and the other end detachably connected to the other end of the pin.

11. The protection apparatus for wireless positioning device according to claim 10, wherein the fixing plate is provided with a fixing buckle, the mounting seat is provided with a through hole, and the through hole and the fixing buckle are engaged and fixed.

12. The protection apparatus for wireless positioning device according to claim 11, wherein the fixing plate is provided with two spaced fixing buckles, and ends of the two fixing buckles extend toward each other, the mounting seat is provided with two spaced through holes, and the two through holes are respectively engaged with the two fixing buckles.

13. The protection apparatus for wireless positioning device according to claim 10, wherein the pin has one end provided with a spring coil and the other end taken as a needle end, the spring coil is fixedly connected to one end of the mounting seat, and the needle end is detachably connected to the other end of the mounting seat.

14. The protection apparatus for wireless positioning device according to claim 13, wherein the mounting seat has one end provided with a connection slot and the other end provided with a pin buckle, the connection slot being fixedly connected to the spring coil, and the pin buckle being engaged with the needle end.

15. The protection apparatus for wireless positioning device according to claim 14, wherein the other end of the mounting seat is further provided with a blocking part, the blocking part being provided to cover a side of the pin buckle away from the connection slot, the blocking part being configured to limit position of the needle end.

16. A protection apparatus for wireless positioning device, comprising:

a housing provided with a mounting groove and a fixing groove, the mounting groove being configured to accommodate the wireless positioning device, and the fixing groove being formed by an inward recess from one side surface of the housing; and a pin assembly installed in the fixing groove, the pin assembly being used to connect the housing and other objects;

wherein the housing is further provided with a clamping groove communicating with the fixing groove, the clamping groove being formed by a recess extending inwardly from a wall of the fixing groove in a direction away from the fixing groove, and the clamping groove being engaged with the pin assembly;

wherein the clamping groove is circumferentially provided around a periphery of the fixing groove in the circumferential direction of the fixing groove, and the clamping groove is engaged with an edge of the pin assembly;

wherein the fixing groove has a groove width of L1, and a distance from a top end of the clamping groove above the fixing groove to a bottom end of the clamping groove below the fixing groove is L2, wherein L1 and L2 satisfy: $10\% < L1/L2 < 88\%$.

* * * * *